United States Patent [19]
Jaster et al.

[11] Patent Number: 5,904,049
[45] Date of Patent: *May 18, 1999

[54] REFRIGERATION EXPANSION CONTROL

[75] Inventors: Heinz Jaster, Schenectady, N.Y.; Jin-Koo Park, Seoul, Rep. of Korea

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,611

[22] Filed: Mar. 31, 1997

[51] Int. Cl.$^6$ .............................. F25B 41/04; F25D 17/04
[52] U.S. Cl. ................................. 62/204; 62/212
[58] Field of Search .............................. 62/187, 180, 212, 62/204, 498, 225

[56] References Cited

U.S. PATENT DOCUMENTS

| | | | |
|---|---|---|---|
| 3,577,743 | 5/1971 | Long | 62/212 |
| 4,325,508 | 4/1982 | Kunz | 62/225 X |
| 4,835,976 | 6/1989 | Torrence | 62/204 X |
| 5,044,170 | 9/1991 | Tanaka | 62/225 |
| 5,272,884 | 12/1993 | Cur et al. | 62/194 |
| 5,357,765 | 10/1994 | Thomas et al. | 62/180 X |
| 5,375,428 | 12/1994 | LeClear et al. | 62/187 |
| 5,415,008 | 5/1995 | Bessler | 62/212 |
| 5,425,246 | 6/1995 | Bessler | 62/211 |
| 5,426,952 | 6/1995 | Bessler | 62/211 |
| 5,435,145 | 7/1995 | Jaster | 62/115 |
| 5,463,876 | 11/1995 | Bessler et al. | 62/223 |
| 5,630,323 | 5/1997 | Niijima et al. | 62/498 X |

FOREIGN PATENT DOCUMENTS

| | | | |
|---|---|---|---|
| 402097871 | 4/1990 | Japan | 62/204 |

*Primary Examiner*—William Wayner
*Attorney, Agent, or Firm*—Patrick K. Patnode; Marvin Snyder

[57] ABSTRACT

A refrigeration system is disposed within a refrigerator having a freezer compartment and a refrigeration compartment. The refrigeration system includes an evaporator having an inlet and an outlet. A damper is positioned so as to direct air flow into the freezer compartment or the refrigeration compartment and correspondingly block air flow to the other. A compressor is coupled to the evaporator via a conduit and a control valve is coupled to the inlet of the evaporator to control flow of refrigerant. A condenser is coupled to the control valve by a liquid line. A first temperature sensor is positioned so as to detect refrigerant temperature within the evaporator and a second temperature sensor is positioned so as to detect refrigerant temperature at the outlet of the evaporator. A first controller is coupled to the control valve and to the first and second temperature sensors to receive temperature signals therefrom. A second controller is coupled to the compressor to provide compressor signals thereto and to the damper to send damper signals thereto. The first controller controls the duty cycle of the control valve.

31 Claims, 3 Drawing Sheets

REFRIGERATION EXPANSION CONTROL

BACKGROUND OF THE INVENTION

This application relates to refrigeration systems and in particular relates to refrigeration expansion control for vapor compression refrigeration cycles.

Household refrigerators typically operate on a simple vapor compression cycle. Such a cycle typically includes a compressor, a condenser, an expansion device, and an evaporator connected in series and charged with a refrigerant. The evaporator is a specific type of heat exchanger which transfers heat from air passing over the evaporator to refrigerant flowing through the evaporator, thereby causing the refrigerant to vaporize. The cooled air is then used to refrigerate one or more freezer or fresh food compartments.

In conventional single-evaporator refrigerators, since the freezer compartment and the fresh food compartment are simultaneously cooled with one evaporator, the temperature of the evaporator must be maintained at a temperature lower than about −18° C., which is typically the temperature of the freezer compartment. Accordingly, an evaporator with a lower temperature than is necessary is used to cool the fresh food compartment, causing the efficiency of the overall system to be relatively low.

In an attempt to address this problem, some conventional refrigerators are designed so that the cool air of the freezer compartment and that of fresh food compartment are completely separated, and an evaporator is provided in both the freezer compartment and the fresh food compartment. Since an additional evaporator is needed, however, the manufacturing cost of the refrigerator is increased and the capacity of the refrigerator is reduced.

Other conventional refrigerators require at least two capillary tubes to control expansion. Each capillary tube is preceded in the refrigerant flow path by an electrically activated valve in order to control liquid discharge from the condenser to selectively flow through one of the capillary tubes. An air flow direction control scheme directs air flow to and from the sole evaporator to be either fresh food or freezer compartment air. When the air flow coupling is with the fresh food compartment (about 5° C.) the refrigerant operates at a relatively high evaporator saturation temperature and when the air flow coupling is with the freezer compartment (about −15° C.), the refrigerant operates at a relatively lower saturation temperature.

Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is substantially a saturated vapor. Accordingly, this is the purpose for two switchable capillary tubes. A higher evaporator saturation temperature produces a high pressure, thus a higher vapor density, thereby generating a greater compressor mass flow rate. To support a higher compressor mass flow rate, a less restrictive capillary tube is required. This system will work satisfactorily near operating conditions for which the capillary tubes were optimized. At off design conditions, the evaporator exit state will be either a vapor quality or superheat and cycle efficiency will be lower.

Therefore, it is apparent from the above that there exists a need in the art for a simplified refrigeration expansion control. It is the purpose of this invention to fulfill this and other needs in the art in a manner more apparent to the skilled artisan once given the following disclosure.

SUMMARY OF THE INVENTION

In accordance with this invention a refrigeration system is disposed within a refrigerator having a freezer compartment and a fresh food compartment. The refrigeration system includes an evaporator having an inlet and an outlet. A damper is positioned so as to selectively direct air flow into the freezer compartment or the refrigeration compartment and correspondingly block air flow to the other. A compressor is coupled to the evaporator via a conduit and a control valve is coupled to the inlet of the evaporator to control flow of refrigerant. A condenser is coupled to the control valve by a liquid line. A first temperature sensor is positioned so as to detect temperature within the evaporator and a second temperature sensor is positioned so as to detect temperature at the outlet of the evaporator. A first controller is coupled to the control valve and to the first and second temperature sensors to receive temperature signals therefrom. A second controller is coupled to the compressor to provide compressor signals thereto and to the damper to send damper signals thereto. The first controller controls the duty cycle of the control valve.

DETAILED DESCRIPTION OF THE INVENTION

Figure 1:
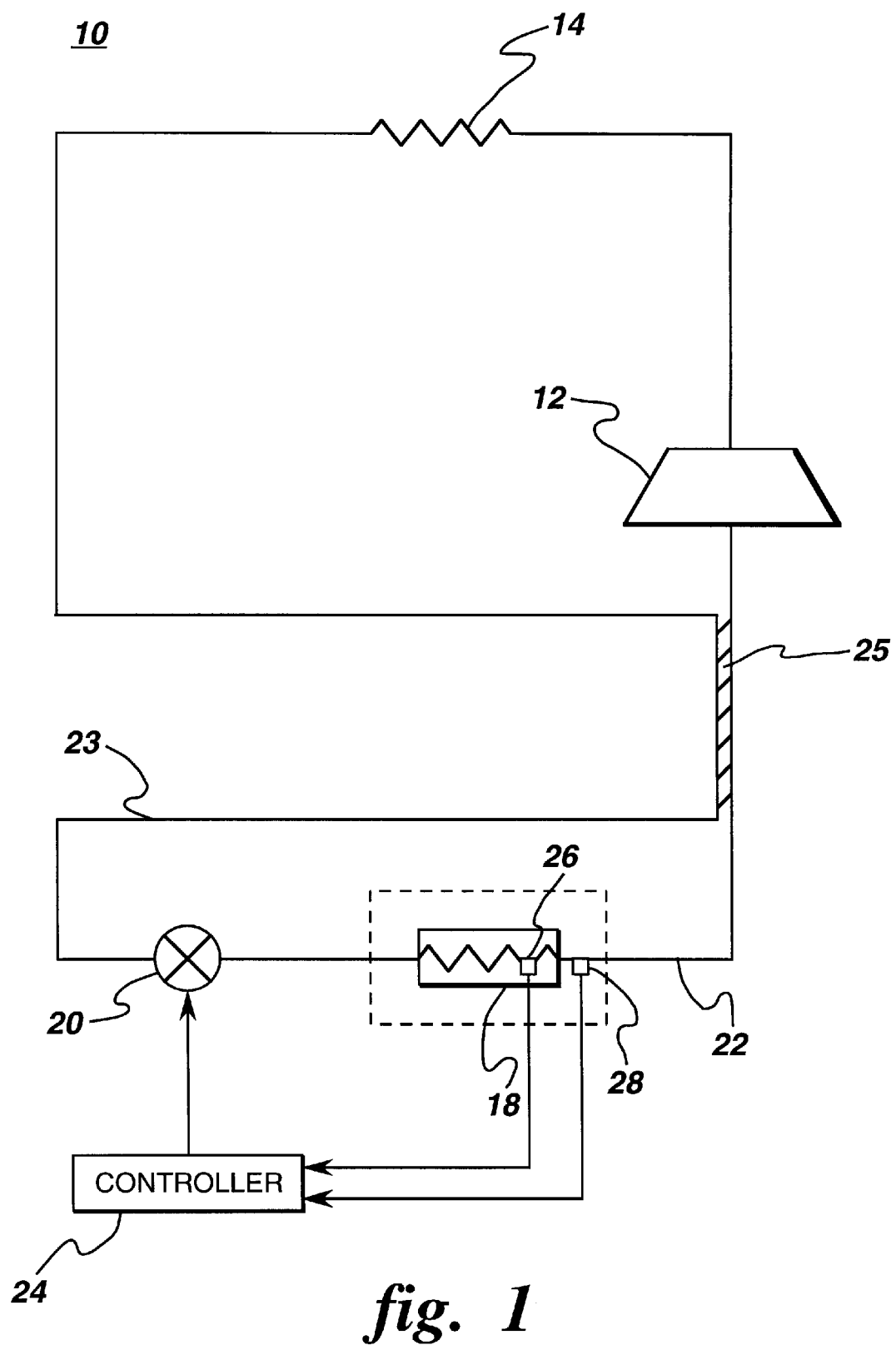
FIG. 1 is a schematic representation of one embodiment of a refrigeration system in accordance with the present invention.

A refrigeration system 10 comprises a compressor 12, a condenser 14, a control valve 20 and an evaporator 18 as shown in FIG. 1. A conduit 22 connects compressor 12 and evaporator 18 providing flow communication therebetween. Condenser 14 and evaporator 18 are connected with a liquid line 23. Control valve 20 disposed within liquid line 23 typically comprises an electrically controlled valve, for example, a solenoid valve. Control valve 20 is the throttling or metering device which controls the operation of refrigeration system 10. Control valve 20 is typically a closed valve, that is, control valve 20 closes when it is not energized.

Each of the above-mentioned elements are connected in series, in that order, in a refrigerant flow relationship for providing cooling to a freezer compartment or a fresh food compartment. Control valve 20 may be a pulse width modulated valve and typically is controlled by a method such as those described in commonly assigned U.S. Pat. Nos. 5,415,008, 5,425,246, 5,426,952 or 5,463,876, each of which is herein incorporated by reference.

Refrigeration system 10 further comprises a first controller 24 which is electrically coupled to control valve 20. First controller 24 comprises circuitry, such as a microprocessor chip or the like.

Refrigeration system 10 may comprise additional components, as a "series connection" as used herein means that during normal operation, refrigerant is conveyed through each of these components. The refrigerant used within refrigeration system 10 can be any refrigerant including but not limited to 1,1,1,2- tetrafluoroethane, dichlorodifluoromethane, ammonium, propane or the like.

Compressor 12 may comprise any type of compressor or mechanism which provides a compressed refrigerant output such as a single stage compressor, a rotary compressor, or any reciprocating compressor. Compressor 12 is coupled to condenser 14 which in turn is coupled to control valve 20.

Evaporator 18 may comprise any type of evaporator including a spine fin evaporator or a spread serpentine evaporator as described in commonly assigned U.S. Pat. No. 5,157,943. By way of example and not limitation, FIG. 1 depicts liquid line 23 with a fraction of its length in thermal contact with conduit 22, which connects evaporator 18 and compressor 12. Thermal contact such as this can be achieved by providing a thermal coupling material 25 (shown as crosshatching in FIG. 1), between conduit 22 and liquid line 23 to facilitate thermal transfer. The heat transfer occurs in a counter-float arrangement with the flow within liquid line 23 proceeding in a direction opposite to that of flow within conduit 22. This arrangement enhances the heat exchange efficiency of refrigeration system 10.

A first temperature sensor 26 is disposed so as to detect the temperature of the refrigerant prior to exiting evaporator 18. A second temperature sensor 28 is disposed so as to detect the temperature of the refrigerant at the outlet of evaporator 18. Temperature sensors 26, 28 typically comprise a solid state sensor or the like such as resistance temperature detectors (RTDs), thermocouples or thermistors. First temperature sensor 26 and second temperature sensor 28 are electrically coupled to first controller 24.

Figure 2:
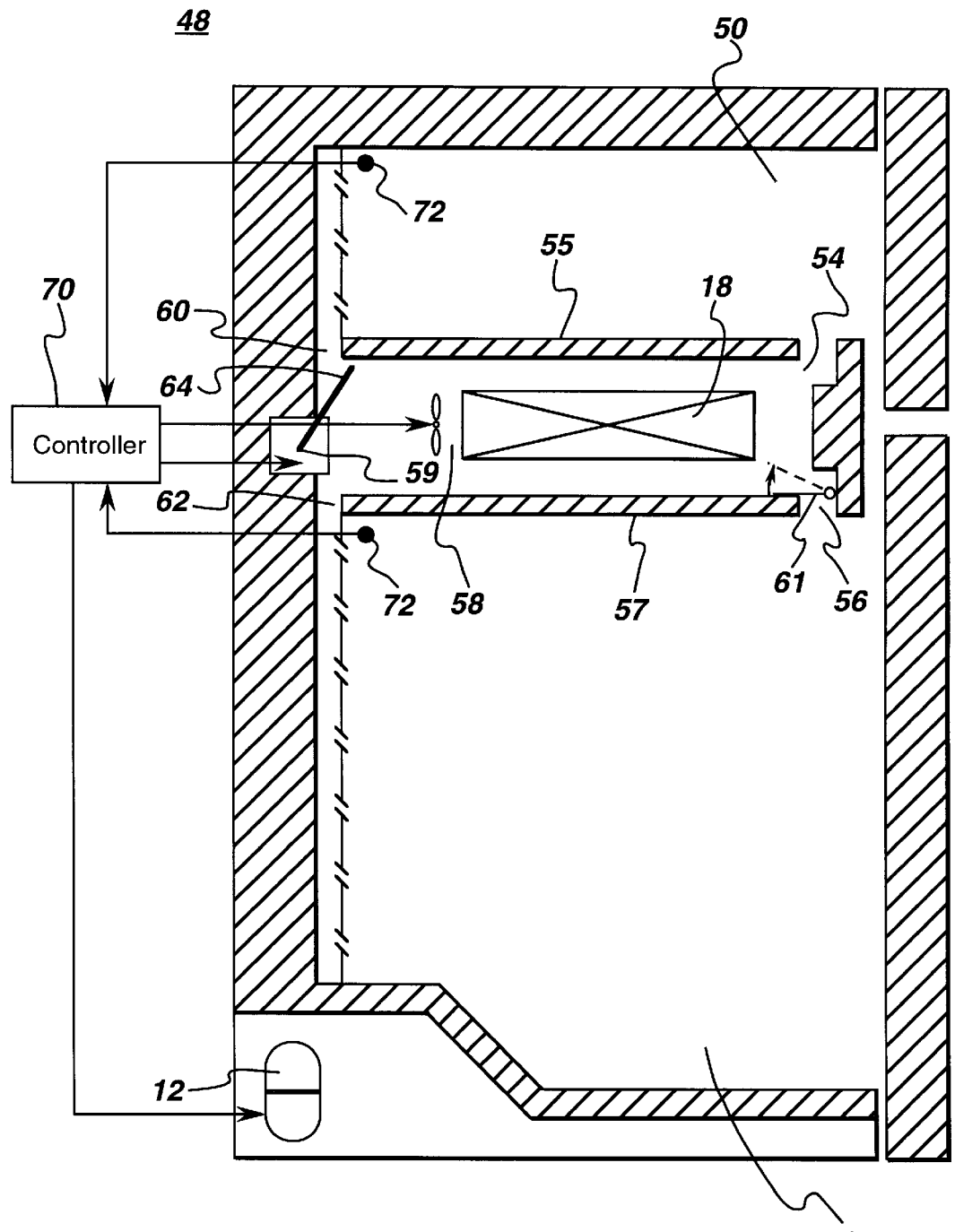
FIG. 2 is an cross-sectional plan view of an exemplary refrigerator in accordance with the present invention.

In accordance with one embodiment of the instant invention, an exemplary refrigerator 48 comprising a freezer compartment 50 and a fresh food compartment 52, is shown in FIG. 2. Freezer and fresh food compartments 50, 52 typically comprise a housing formed with thermally insulated walls provided with an opening or a door for placement or removal of food articles or the like into or from the interior of freezer or fresh food compartment 50, 52. Refrigeration system 10 (FIG. 1) is provided in thermal association with freezer and fresh food compartment 50, 52 having several components of refrigeration system 10 (FIG. 1) mounted on or in the housing containing freezer or fresh food compartment 50, 52 and adapted with freezer and fresh food compartment 50, 52 to cool the interior thereof.

A first cool air circulating duct intake gate 54 is disposed within a first baffle 55 adjacent freezer compartment 50 for introducing cool air to circulate in freezer compartment 50. A second cool air circulating intake gate 56 is disposed within a second baffle 57 adjacent refrigerator compartment 52 for introducing cool air to circulate in refrigerator compartment 52. Evaporator 18 is disposed between first and second baffles 55, 57 so as to exchange heat with the cool air introduced through first intake gate 54 of freezer compartment 50 and second intake gate 56 of refrigerator compartment 52. A fan 58 is provided for selectively introducing air, which is cooled by heat-exchanging in evaporator 18, into freezer compartment 50 or refrigerator compartment 52.

A damper 59 is disposed proximate first baffle 55 and second baffle 57 so as to control the amount of cooling air entering freezer compartment 50 and refrigerator compartment 52 through a first inlet 60 and second inlet 62. Damper 59 opens and closes air flow through each inlet 60, 62 by positioning a plate 60 such that cool air can be selectively introduced into freezer compartment 50 or refrigerator compartment 52.

Cool air which circulates in freezer compartment 50 is introduced between first baffle 55 and second baffle 57 through first intake gate 54. Cool air which circulates in refrigerator compartment 52 is introduced between first baffle 55 and second baffle 57 through second intake gate 56.

The cool air introduced between first baffle 55 and second baffle 57 is cooled through heat exchange with evaporator 18 disposed within first and second baffle 55, 57. The cooled air is directed by the rotation of fan 58 towards first inlet 60 and second inlet 62 and selectively introduced into freezer compartment 50 or refrigerator compartment 52 in accordance with the positioning of plate 64 in damper 59 so as to control the amount of cool air entering each respective compartment.

In one embodiment of the instant invention, a flexible flap 61 (FIG. 2) is positioned at second intake gate 56. Flexible flap 61 is movable between a closed position which blocks air flow through second intake gate 56 and an open position (shown in phantom in FIG. 2) which allows air flow through second intake gate 56. Flexible flap 61 is lifted to an open position by pressure when air is circulated within fresh food compartment 52, as discussed below. Flexible flap 61 typically comprises polypropylene, polyethylene or the like.

A second controller 70 is electrically coupled to damper 59, fan 58 and compressor 12 and typically generates control signals corresponding to at least three modes; an "OFF" MODE; a FRESH FOOD MODE; and a FREEZER MODE.

During "OFF" MODE operation, second controller 70 generates a compressor signal to de-activate compressor 12, and a fan signal to de-activate fan 58, such as when a compartment temperature sensor 72 detects the temperature of freezer compartment 50 or fresh food compartment 52 has been cooled to a temperature below a predetermined set temperature. Additionally, during "OFF" MODE, controller 70 cuts the power source to control valve 20 (FIG. 1) causing control valve 20 to move to a closed position, as discussed above. The closing of control valve 20 during the "OFF" MODE prevents refrigerant migration to evaporator 18, thereby conserving energy. Control valve 20 therefore acts as an energy valve eliminating the need for a separate valve to serve this function. In one embodiment, flexible flap 61 is in a closed position during "OFF" MODE so as to prevent the heavier air within freezer compartment 50 from flowing through first intake gate 54 and second intake gate 56 into fresh food compartment 52. Such a flow of air from freezer section 50 to fresh food compartment 52 would create energy loss within the system.

During FRESH FOOD MODE operation, second controller 70 generates a compressor signal to activate compressor 12, and a fan signal to activate fan 58 (FIG. 2), such as when compartment temperature sensor 72 detects the temperature of fresh food compartment 52 has risen above some predetermined set temperature. High pressure gaseous refrigerant is discharged from compressor 12 and is condensed in condenser 14 (FIG. 1). The now-liquid refrigerant is expanded through control valve 20 to a lower pressure and flows to evaporator 18. The refrigerant under low pressure, and correspondingly at a low temperature, enters evaporator 18, where the refrigerant is evaporated in a conventional manner. The evaporation of the refrigerant lowers the temperature of the air surrounding evaporator 18. The cooled air is directed by the rotation of fan 58 (FIG. 2) towards first inlet 60 and second inlet 62.

Second controller 70 generates a damper signal to damper 59 causing damper 59 to move plate 64 so as to block flow through first inlet 60. The cool air is accordingly introduced through second inlet 62 into fresh food compartment 52 and circulated. The refrigerant vapor is then drawn into compressor 12, and the cycle continues until the temperature detected by compartment temperature sensor 72, within fresh food compartment 52, is reduced to a lower setpoint temperature and second controller 70, monitoring the detected temperature, re-initiates "OFF" MODE operation, and generates a compressor signal to de-activate compressor 12. In one embodiment, flexible flap 61 is in an open position during FRESH FOOD MODE to allow flow through second intake gate 56.

During FRESH FOOD MODE, the average flow rate through control valve 20 is dependent on the selected duty cycle. Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is close to a saturated vapor. A higher evaporator saturation temperature produces a higher pressure thus a higher vapor density thereby generating a greater compressor mass flow rate. In one embodiment, to support a higher compressor mass flow rate, first controller 24 adjusts control valve 20 so that the time (t1) control valve 20 is fully open is increased with respect to the time (t2) control valve 20 is fully closed, thereby producing a larger average flow rate. To support a lower compressor mass flow rate, first controller 24 adjust control valve 20 so that the time (t1) control valve 20 is fully open is lessened with respect to the time (t2) control valve 20 is fully closed, thereby producing a relatively lower average flow rate.

First controller 24 receives temperature signals from first temperature sensor 26 and second temperature sensor 28. In order to ensure the evaporator exit state is a substantially saturated vapor, first controller 24 monitors the temperature of first temperature sensor 26, positioned within evaporator 18 and the temperature of second temperature sensor 28, positioned at the outlet of evaporator 18. First controller 24 directs control valve 20 on the basis of evaporator dryness (i.e., the amount of liquid refrigerant), ensuring the evaporator exit state is substantially a saturated vapor. The level of dryness indicates whether evaporator 18 requires more refrigerant. In vapor compression cycle refrigeration systems, the difference between the refrigerant temperature prior to exiting evaporator 18, measured by first temperature sensor 26, and the refrigerant temperature at the exit of evaporator 18, measured by second temperature sensor 28 should be in the range between about 1° C. to about 4° C.

Accordingly, first controller 24 receives a first temperature signal corresponding to the evaporator refrigerant temperature from first temperature sensor 26 and a second temperature signal corresponding to the refrigerant exit temperature from second temperature sensor 28. In response to these temperature signals, controller produces a valve signal which is fed to control valve 20. The valve signal causes control valve 20 to oscillate between a fully open condition and a fully closed position such that the duty cycle of the open-to-closed conditions determines the average flow rate through control valve 20. The pulse width is adjusted in accordance with the detected temperatures from first temperature sensor 26 and second temperature sensor 28 so as to maintain the exit state of evaporator 18 as a substantially saturated vapor such that optimal system performance is obtained.

During FREEZER MODE operation, second controller 70 generates a compressor signal to activate compressor 12, and a fan signal to activate fan 58, such as when temperature sensor 72 detects the temperature of freezer compartment 50 has risen above some predetermined set temperature. High pressure gaseous refrigerant is discharged from compressor 12 and condensed in condenser 14. The now-liquid refrigerant is expanded through control valve 20 to a lower pressure and flows to evaporator 18. The refrigerant under low pressure, and correspondingly at a low temperature, enters evaporator 18, where the refrigerant is evaporated in a conventional manner. The evaporation of the refrigerant lowers the temperature of the air surrounding evaporator 18. The cooled air is directed by the rotation of fan 58 towards first inlet 60 and second inlet 62.

Second controller 70 generates a damper signal to damper 59 causing damper 59 to move plate 64 so as to block air flow through second inlet 62. The cool air is accordingly introduced through first inlet 60 into freezer compartment 50 and circulated. The refrigerant vapor is then drawn into compressor 12, and the cycle continues until the temperature detected by compartment temperature sensor 72, within freezer compartment 50, is reduced to a lower setpoint temperature and second controller 70, monitoring the detected temperature, re-initiates "OFF" MODE operation, and generates a compressor signal to de-activate compressor 12. In one embodiment, flexible flap 61 is in a closed position during FREEZER MODE to block flow through second intake gate 56.

First controller 24 receives temperature signals from first temperature sensor 26 and second temperature sensor 28. In order to ensure the evaporator exit state is a substantially saturated vapor, first controller 24 monitors the temperature of first temperature sensor 26, positioned within evaporator 18 and the temperature of second temperature sensor 28, positioned at the outlet of evaporator 18. First controller 24 directs control valve 20 on the basis of evaporator dryness (i.e., the amount of liquid refrigerant), ensuring the evaporator exit state is substantially a saturated vapor. The level of dryness indicates whether evaporator 18 requires more refrigerant. In vapor compression cycle refrigeration systems, the difference between the refrigerant temperature prior to exiting evaporator 18, measured by first temperature sensor 26, and the refrigerant temperature at the exit of evaporator 18, measured by second temperature sensor 28 should be in the range between about 1° C. to about 4° C.

Accordingly, first controller 24 receives a first temperature signal corresponding to the evaporator temperature from first temperature sensor 26 and a second temperature signal corresponding to the evaporator exit temperature from second temperature sensor 28. In response to these temperature signals, first controller 24 produces a valve signal which is fed to control valve 20. The valve signal causes control valve 20 to oscillate between a fully open condition and a fully closed position such that the duty cycle of the open-to-closed conditions determines the average flow rate through control valve 20. The pulse width is adjusted in accordance with the detected temperatures from first temperature sensor 26 and second temperature sensor 28 so as to maintain the exit state of evaporator 18 as a substantially saturated vapor, such that optimal system performance is obtained. In one embodiment of the instant invention, first controller 24 and second controller 70 are combined within a single controller performing the same functions as denoted above.

Figure 3:
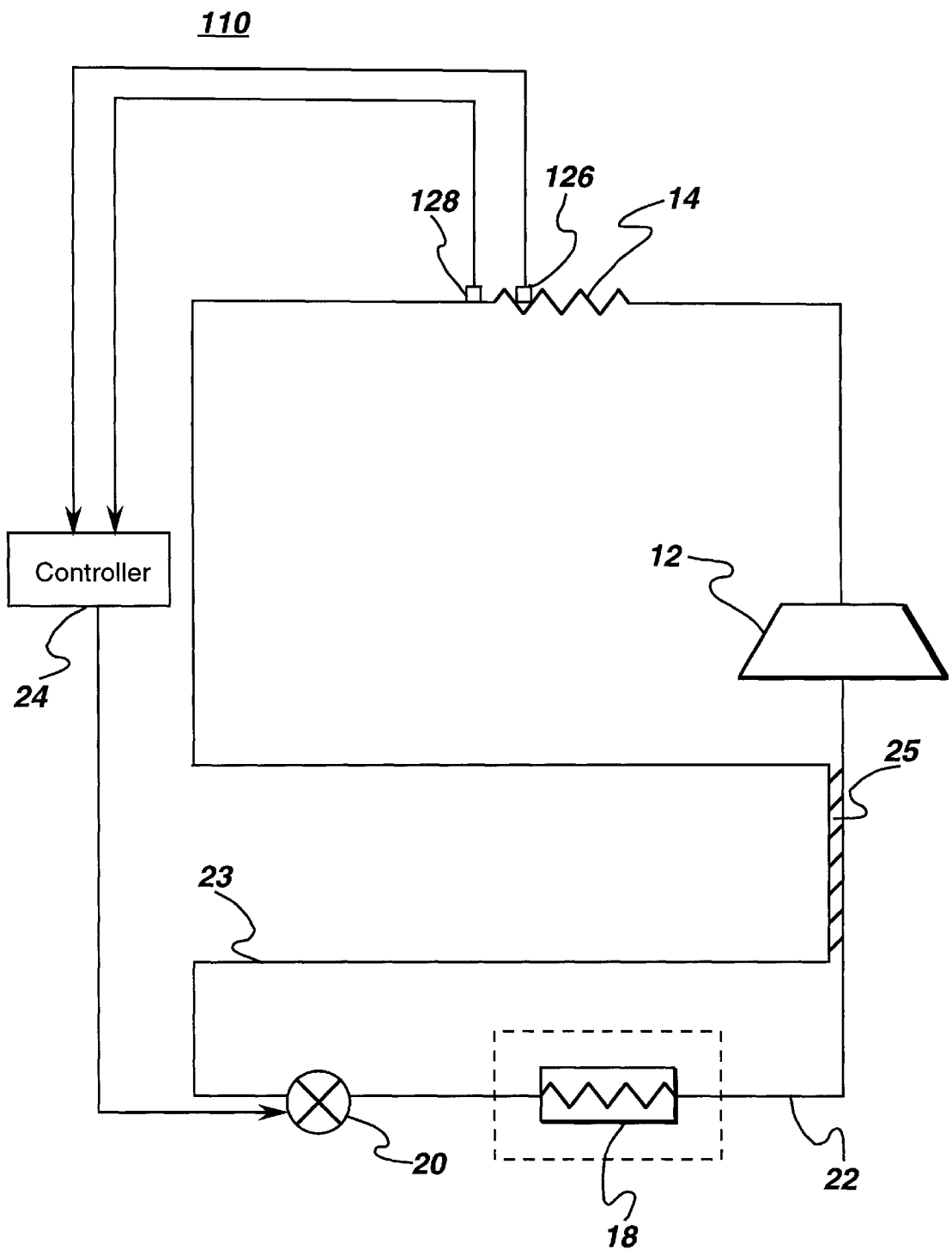
FIG. 3 is a schematic representation of another embodiment of a refrigeration system in accordance with the present invention.

In an alternative embodiment of the instant invention, as shown in FIG. 3, refrigeration system 110 includes a first temperature sensor 126 for detecting the temperature of the refrigerant prior to exiting condenser 14 and a second temperature sensor 128 for detecting the temperature of the refrigerant at the outlet of condenser 14.

During FRESH FOOD MODE, in refrigeration system 110, the average flow rate through control valve 20 is dependent on the selected duty cycle. Lower condenser refrigerant saturation temperature is desirable since the lower the saturation temperature, the greater the obtainable cycle efficiency. The cycle efficiency, however, will only be greater for lower temperatures if the condenser exit state is such that the refrigerant is close to a compressed fluid with very little sub-cooling.

First controller 24 receives temperature signals from first temperature sensor 126 and second temperature sensor 128. In order to ensure the condenser exit state is not sub-cooled, first controller 24 monitors the temperature of first temperature sensor 126 and the temperature of second temperature sensor 128. First controller 24 directs control valve 20 on the basis of condenser temperature difference between first temperature sensor 126 and temperature sensor 128. The difference between the refrigerant temperature prior to exiting condenser, measured by first temperature sensor 126, and the refrigerant temperature at the exit of condenser 14, measured by second temperature sensor 128 should be in the range between about 1° C. to about 4° C.

Accordingly, first controller 24 receives a first temperature signal corresponding to the condenser refrigerant temperature from first temperature sensor 126 and a second temperature signal corresponding to the refrigerant exit temperature from second temperature sensor 128. In response to these temperature signals, first controller 24 produces a valve signal which is fed to control valve 20. The valve signal causes control valve 20 to oscillate between a fully open condition and a fully closed position such that the duty cycle of the open-to-closed conditions determines the average flow rate through control valve 20. The pulse width is adjusted in accordance with the detected temperatures from first temperature sensor 126 and second temperature sensor 128 so as to maintain the exit state of condenser 14 as a substantially non-sub-cooled fluid such that optimal system performance is obtained.

During FREEZER MODE operation, first controller 24 receives temperature signals from first temperature sensor 126 and second temperature sensor 128. In order to ensure the condenser exit state is a non-sub-cooled fluid, first controller 24 monitors the temperature of first temperature sensor 126 and the temperature of second temperature sensor 128. First controller 24 directs control valve 20 on the basis of the condenser temperature difference between first temperature sensor 126 and temperature sensor 128. The difference between the refrigerant temperature prior to exiting condenser 14, measured by first temperature sensor 126, and the refrigerant temperature at the exit of condenser 14, measured by second temperature sensor 128 should be in range between about 1° C. to about 4° C.

Accordingly, first controller 24 receives a first temperature signal corresponding to the condenser refrigerant temperature from first temperature sensor 126 and a second temperature signal corresponding to the refrigerant exit temperature from second temperature sensor 128. In response to these temperature signals, first controller 24 produces a valve signal which is fed to control valve 20. The valve signal causes control valve 20 to oscillate between a fully open condition and a fully closed position such that the duty cycle of the open-to-closed conditions determines the average flow rate through control valve 20. The pulse width is adjusted in accordance with the detected temperatures from first temperature sensor 126 and second temperature sensor 128 so as to maintain the exit state of condenser as a substantially non-sub-cooled fluid, such that optimal system performance is obtained.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A refrigeration system disposed within a refrigerator having a freezer compartment and a fresh food compartment, said refrigeration system comprising:

an evaporator having an inlet and an outlet;

a damper provided so as to direct air flow to said freezer compartment or said fresh food compartment and correspondingly block air flow to the other;

a compressor coupled to said evaporator via a conduit;

a control valve coupled to said inlet of said evaporator so as to control refrigerant flow therethrough;

a condenser coupled to said control valve by a liquid line;

a first temperature sensor positioned so as to detect refrigerant temperature within said evaporator;

a second temperature sensor positioned so as to detect refrigerant temperature at said outlet of said evaporator;

a first controller coupled to said control valve to provide respective control signals thereto and to said first and second temperature sensors to receive temperature signals therefrom; and a second controller coupled to said compressor to provide compressor signals thereto and to said damper to send damper signals thereto;

wherein said first controller receives a first temperature signal from said first temperature sensor and a second temperature signal from said second temperature sensor and in response to said signals said first controller sends said control signal to said control valve so as to cause said control valve to oscillate between a fully open condition and a fully closed position such that the duty cycle of the open-to-closed conditions determines the average flow rate of refrigerant through said control valve wherein said oscillation of said control valve is adjusted so as to maintain the temperature difference between said first temperature signal and said second temperature signal in the range between about 1° C. to about 4° C. so as to maintain the exit state of refrigerant at said outlet of said evaporator as a substantially saturated vapor to obtain optimal system performance.

2. A refrigeration system in accordance with claim 1, wherein said control valve is a pulse width modulated valve.

3. A refrigeration system in accordance with claim 1, wherein said conduit and said liquid line are in thermal contact so as to form a heat exchanger therebetween.

4. A refrigeration system in accordance with claim 1, further comprising a fan provided so as to direct cooled air over said evaporator so as to be selectively introduced into said freezer compartment or said fresh food compartment in accordance with the positioning of said damper.

5. A refrigeration system in accordance with claim 1, wherein said second controller generates control signals corresponding to at least three modes, an "off" mode, a fresh food mode and a freezer mode.

6. A refrigeration system in accordance with claim 5, wherein during said "off" mode said second controller generates said compressor signal to de-activate said compressor and close said control valve.

7. A refrigeration system in accordance with claim 5, wherein during said fresh food mode said second controller generates said compressor signal to activate said compressor and said damper signal to said damper causing said damper to block air flow to said freezer compartment and correspondingly direct air flow into said fresh food compartment.

8. A refrigeration system in accordance with claim 5, wherein during said freezer mode said second controller generates said compressor signal to activate said compressor and said damper signal to said damper causing said damper to block air flow to said fresh food compartment and correspondingly direct air flow into said freezer compartment.

9. A refrigeration system in accordance with claim 8, wherein said first controller receives a first temperature signal from said first temperature sensor and a second temperature signal from said second temperature sensor and in response to said signals said first controller sends said control signal to said control valve so as to cause control valve to oscillate between a fully open condition and a fully closed position such that the duty cycle of the open-to-closed conditions determines the average flow rate of refrigerant through said control valve.

10. A refrigeration system in accordance with claim 9, wherein said oscillation of said control valve is adjusted so as to maintain the temperature difference between said first temperature signal and said second temperature signal in the range between about 1° C. to about 4° C.

11. A refrigeration system in accordance with claim 8, wherein said oscillation of said control valve is adjusted in accordance with said temperature signals so as to maintain the exit state at said outlet of said evaporator as a substantially saturated vapor to obtain optimal system performance.

12. A refrigerator comprising:
    a fresh food compartment;
    a freezer compartment;
    an evaporator having an inlet and an outlet, said evaporator disposed between said fresh food compartment and said freezer compartment between a first baffle having a first intake gate and a first inlet and a second baffle having an second intake gate and a second inlet;
    a damper positioned between said first and second baffles so as to direct air flow to said freezer compartment through said first inlet or to said fresh food compartment through said second inlet and correspondingly block air flow to the other;
    a compressor coupled to said evaporator via a conduit;
    a control valve coupled to said inlet of said evaporator so as to control refrigerant flow therethrough;
    a condenser coupled to said control valve by a liquid line;
    a first temperature sensor positioned so as to detect refrigerant temperature within said evaporator;
    a second temperature sensor positioned so as to detect refrigerant temperature at said outlet of said evaporator;
    a first controller coupled to said control valve to provide respective control signals thereto and to said first and second temperature sensors to receive temperature signals therefrom; and
    a second controller coupled to said compressor to provide compressor signals thereto and to said damper to send damper signals thereto;
    wherein said first controller receives a first temperature signal from said first temperature sensor and a second temperature signal from said second temperature sensor and in response to said signals said first controller sends said control signal to said control valve so as to cause control valve to oscillate between a fully open condition and a fully closed position such that the duty cycle of the open-to-closed conditions determines the average flow rate of refrigerant through said control valve wherein said oscillation of said control valve is adjusted so as to maintain the temperature difference between said first temperature signal and said second temperature signal in the range between about 1° C. to about 4° C. so as to maintain the exit state of refrigerant at said outlet of said evaporator as a substantially saturated vapor to obtain optimal system performance.

13. A refrigerator in accordance with claim 12, wherein said control valve is a pulse width modulated valve.

14. A refrigerator in accordance with claim 12, wherein said conduit and said liquid line are in thermal contact so as to form a heat exchanger therebetween.

15. A refrigerator in accordance with claim 12, further comprising a fan provided so as to direct cooled air over said evaporator so as to be selectively introduced into said freezer compartment or said fresh food compartment in accordance with the positioning of said damper.

16. A refrigerator in accordance with claim 12, wherein said second controller generates control signals corresponding to at least three modes, an "off" mode, a fresh food mode and a freezer mode.

17. A refrigerator in accordance with claim 16, wherein during said freezer mode said second controller generates said compressor signal to activate said compressor and said damper signal to said damper causing said damper to block air flow to said fresh food compartment and correspondingly direct air flow into said freezer compartment.

18. A refrigerator in accordance with claim 17, wherein said first controller receives a first temperature signal from said first temperature sensor and a second temperature signal from said second temperature sensor and in response to said signals said first controller sends said control signal to said control valve so as to cause control valve to oscillate between a fully open condition and a fully closed position such that the duty cycle of the open-to-closed conditions determines the average flow rate of refrigerant through said control valve.

19. A refrigerator in accordance with claim 18, wherein said oscillation of said control valve is adjusted so as to maintain the temperature difference between said first temperature signal and said second temperature signal in the range between about 1° C. to about 4° C.

20. A refrigerator in accordance with claim 17, wherein said oscillation of said control valve is adjusted in accordance with said temperature signals so as to maintain the exit state at said outlet of said evaporator as a substantially saturated vapor to obtain optimal system performance.

21. A refrigerator in accordance with claim 16, wherein during said "off" mode said second controller generates said compressor signal to de-activate said compressor and close said control valve.

22. A refrigerator in accordance with claim 21, wherein during said fresh food mode said second controller generates said compressor signal to activate said compressor and said damper signal to said damper causing said damper to block air flow to said freezer compartment and correspondingly direct air flow into said fresh food compartment.

23. A refrigeration system disposed within a refrigerator having a freezer compartment and a refrigeration compartment, said refrigeration system comprising:
    an evaporator;
    a damper positioned so as to direct air flow to said freezer compartment or said refrigeration compartment and correspondingly block air flow to the other;
    a compressor having an inlet and an outlet coupled to said evaporator via a conduit;
    a control valve coupled to said evaporator so as to control refrigerant flow therethrough;

a condenser coupled to said control valve by a liquid line;

a first temperature sensor positioned so as to detect refrigerant temperature within said condenser;

a second temperature sensor positioned so as to detect refrigerant temperature at said outlet of said condenser;

a first controller coupled to said control valve to provide respective control signals thereto and to said first and second temperature sensors to receive temperature signals therefrom; and a second controller coupled to said compressor to provide compressor signals thereto and to said damper to send damper signals thereto;

wherein said first controller receives a first temperature signal from said first temperature sensor and a second temperature signal from said second temperature sensor and in response to said signals said first controller sends said control signal to said control valve so as to cause control valve to oscillate between a fully open condition and a fully closed position such that the duty cycle of the open-to-closed conditions determines the average flow rate of refrigerant through said control valve wherein said oscillation of said control valve is adjusted so as to maintain the temperature difference between said first temperature signal and said second temperature signal in the range between about 1° C. to about 4° C. so as to maintain the exit state of refrigerant at said outlet of said evaporator as a substantially saturated vapor to obtain optimal system performance.

24. A refrigeration system in accordance with claim 23, further comprising a fan provided so as to direct cooled air over said evaporator so as to be selectively introduced into said freezer compartment or said fresh food compartment in accordance with the positioning of said damper.

25. A refrigeration system in accordance with claim 23, wherein said second controller generates control signals corresponding to at least three modes, an "off" mode, a fresh food mode and a freezer mode.

26. A refrigeration system in accordance with claim 25, wherein during said "off" mode said second controller generates said compressor signal to de-activate said compressor and close said control valve.

27. A refrigeration system in accordance with claim 25, wherein during said fresh food mode said second controller generates said compressor signal to activate said compressor and said damper signal to said damper causing said damper to block air flow to said freezer compartment and correspondingly direct air flow into said fresh food compartment.

28. A refrigeration system in accordance with claim 25, wherein during said freezer mode said second controller generates said compressor signal to activate said compressor and said damper signal to said damper causing said damper to block air flow to said fresh food compartment and correspondingly direct air flow into said freezer compartment.

29. A refrigeration system in accordance with claim 28, wherein said first controller receives a first temperature signal from said first temperature sensor and a second temperature signal from said second temperature sensor and in response to said signals said first controller sends said control signal to said control valve so as to cause control valve to oscillate between a fully open condition and a fully closed position such that the duty cycle of the open-to-closed conditions determines the average flow rate of refrigerant through said control valve.

30. A refrigeration system in accordance with claim 28, wherein said oscillation of said control valve is adjusted in accordance with said temperature signals so as to maintain the exit state at said outlet of said condenser as a substantially non-sub-cooled compressed fluid to obtain optimal system performance.

31. A refrigeration system in accordance with claim 30, wherein said oscillation of said control valve is adjusted so as to maintain the temperature difference between said first temperature signal and said second temperature signal in the range between about 1° C. to about 4° C.

\* \* \* \* \*